(12) United States Patent
Hoshino et al.

(10) Patent No.: US 12,246,479 B2
(45) Date of Patent: Mar. 11, 2025

(54) BLOW MOLDING DEVICE

(71) Applicant: YOSHINO KOGYOSHO CO., LTD., Tokyo (JP)

(72) Inventors: Hideaki Hoshino, Tokyo (JP); Mitsuru Shiokawa, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 283 days.

(21) Appl. No.: 17/639,121

(22) PCT Filed: Jul. 1, 2020

(86) PCT No.: PCT/JP2020/025923
§ 371 (c)(1),
(2) Date: Feb. 28, 2022

(87) PCT Pub. No.: WO2021/039108
PCT Pub. Date: Mar. 4, 2021

(65) Prior Publication Data
US 2022/0297371 A1   Sep. 22, 2022

(30) Foreign Application Priority Data
Aug. 30, 2019   (JP) ................................ 2019-158856

(51) Int. Cl.
*B29C 49/58*   (2006.01)
*B29C 49/42*   (2006.01)
(Continued)

(52) U.S. Cl.
CPC .......... *B29C 49/58* (2013.01); *B29C 49/4289* (2013.01); *B29C 2049/465* (2013.01); *B29K 2105/253* (2013.01); *B29L 2031/712* (2013.01)

(58) Field of Classification Search
CPC ................ B29C 49/58; B29C 49/4289; B29C 2049/465; B29C 49/46; B29K 2105/253; B29L 2031/712
See application file for complete search history.

(56) References Cited

U.S. PATENT DOCUMENTS

2014/0367895 A1*  12/2014  Sato ....................... B29C 49/12
                                                              264/532
2018/0043606 A1    2/2018  Morikami et al.
2020/0353666 A1*  11/2020  Shiokawa ............... B29C 49/58

FOREIGN PATENT DOCUMENTS

CN      103203857 A      7/2013
JP      2013-208834 A   10/2013
(Continued)

OTHER PUBLICATIONS

Sep. 15, 2020 International Search Report issued in International Patent Application No. PCT/JP2020/025923.
(Continued)

*Primary Examiner* — Christopher M Rodd
*Assistant Examiner* — Shibin Liang
(74) *Attorney, Agent, or Firm* — Oliff PLC

(57) ABSTRACT

A blow molding apparatus is configured to blow mold a preform into a container by supplying a pressurized incompressible fluid into the preform from a pressurized fluid supply unit. The blow molding apparatus includes: a drawing and discharging flow path connected to a drawing orifice; a fluid drawing source to apply drawing force to the drawing and discharging flow path, after blow molding is completed and after and/or while the blow nozzle is moved to a standby position, to draw the incompressible fluid adhering to the blow nozzle; and a pressurized gas supply source to supply a pressurized gas to the drawing and discharging flow path, after blow molding is completed and after a next preform is placed into the mold, to cause the
(Continued)

incompressible fluid inside the drawing and discharging flow path to flow out toward the inside of the preform or toward the inside of a container.

18 Claims, 11 Drawing Sheets

(51) Int. Cl.
    *B29C 49/46*         (2006.01)
    *B29K 105/00*       (2006.01)
    *B29L 31/00*         (2006.01)

(56)         References Cited

FOREIGN PATENT DOCUMENTS

| | | | |
|---|---|---|---|
| JP | 2016-168801 A | 9/2016 | |
| JP | 2017-196872 A | 11/2017 | |
| JP | 2019-055514 A | 4/2019 | |
| JP | 2019055514 * | 4/2019 | ............ B29C 49/46 |
| JP | 2019-119099 A | 7/2019 | |

OTHER PUBLICATIONS

Mar. 29, 2023 Office Action issued in Chinese Patent Application No. 202080060992.0.

\* cited by examiner

BLOW MOLDING DEVICE

TECHNICAL FIELD

The present disclosure relates to a blow molding apparatus.

BACKGROUND

Synthetic resin containers, typical examples of which include polypropylene (PP) bottles and polyethylene terephthalate (PET) bottles, are used to contain a variety of contents, such as beverages, cosmetics, pharmaceuticals, detergents, or toiletries like shampoo. Such a container is typically formed by biaxially stretch blow molding a synthetic resin preform into a predetermined shape using a blow molding apparatus, after the preform has been heated to a temperature at which a stretching effect may be achieved. The preform has been formed in a bottomed tubular shape by injection molding or the like.

Blow molding apparatuses that use incompressible fluids, such as pressurized liquids, instead of pressurized air, as pressurizing media to be supplied into preforms are known. In this case, contents which are to be ultimately filled into containers as products may be used as pressurizing incompressible fluids. By doing so, the step of filling contents into containers may be omitted, and the production process and the configurations of blow molding apparatuses may be simplified.

For example, Patent Literature (PTL) 1 describes a blow molding apparatus including a mold for blow molding, a blow nozzle placed above the mold, a pressurized fluid supply source that supplies a pressurized liquid to the blow nozzle, and a blow nozzle moving unit that causes the blow nozzle to move in a vertical direction relative to the mold. The blow molding apparatus is configured to mold a preform into a container having a shape corresponding to a cavity of the mold, by supplying a pressurized liquid into the preform through the blow nozzle in a state in which the blow nozzle is connected to a mouth of the preform.

CITATION LIST

Patent Literature

PTL 1: JP 2013-208834 A

SUMMARY

Technical Problem

In a known blow molding apparatus as described in PTL 1, after a preform has been blow molded into a container and when the blow nozzle is moved upward relative to the mold so as to be detached from a mouth of the container, an incompressible fluid can drip down from the surface of the blow nozzle to which it has adhered. In particular, in a case in which a relatively highly viscous liquid, such as shampoo or liquid detergent, is used as an incompressible fluid for blow molding, it takes long for the dripping down of the liquid to start from the blow nozzle or the like after blow molding. Moreover, the liquid continues to run in a thin stream for a while. Accordingly, the liquid is likely to drip down onto the molded container or the mold from which the container has been removed, possibly causing adhesion of the liquid thereto.

It would be helpful to provide a blow molding apparatus capable of preventing an incompressible fluid from dripping down from the blow nozzle and adhering to a molded container or the mold after blow molding.

A blow molding apparatus according to the present disclosure includes:

a mold for blow molding;

a blow nozzle placed above the mold;

a sealing body configured to open and close the blow nozzle; and a pressurized fluid supply unit configured to supply a pressurized incompressible fluid to the blow nozzle; and a blow nozzle moving unit configured to move the blow nozzle relative to the mold between a connected position, in which the blow nozzle is connected to a mouth of a preform placed into the mold, and a standby position, in which the blow nozzle is above and away from the mouth, wherein the pressurized incompressible fluid is supplied into the preform from the pressurized fluid supply unit through the blow nozzle that is in the connected position, so as to blow mold the preform into a container having a shape corresponding to a cavity of the mold, the blow molding apparatus including:

a drawing and discharging flow path connected to a drawing orifice;

a fluid drawing source connected to the drawing and discharging flow path, the fluid drawing source being configured to apply drawing force to the drawing and discharging flow path, after blow molding is completed and after and/or while the blow nozzle is moved from the connected position to the standby position while the sealing body is closed, so as to draw the incompressible fluid adhering to the blow nozzle into the drawing and discharging flow path; and a pressurized gas supply source connected to the drawing and discharging flow path, the pressurized gas supply source being configured to supply a pressurized gas to the drawing and discharging flow path, after blow molding is completed and after a next preform is placed into the mold, so as to cause the incompressible fluid that has been drawn into the drawing and discharging flow path by the fluid drawing source to flow out through the drawing orifice toward the inside of the preform or toward the inside of a container into which the preform is to be blow molded.

In a preferred embodiment of the present blow molding apparatus configured as above, the drawing orifice is open to the blow nozzle.

In another preferred embodiment of the present blow molding apparatus configured as above, the sealing body includes a tubular wall that is placed inside the blow nozzle when the sealing body is closed, and the tubular wall is provided, on an inner peripheral surface thereof, with a communication groove that extends upward from a lower end of the tubular wall and that communicates with the drawing orifice when the sealing body is closed.

In still another preferred embodiment of the present blow molding apparatus configured as above, the blow molding apparatus includes a discharge rod that is provided with a discharge orifice, that passes through the sealing body, and that is movable relative to the sealing body, the discharge orifice being connected to the pressurized fluid supply unit by a discharge path and being configured to be opened and closed, wherein after blow molding is completed, the blow molding apparatus is configured to perform a first suck-back step of causing the pressurized fluid supply unit to perform a drawing operation in a state in which the sealing body is opened, and a second suck-back step, performed after the first suck-back step, of causing the pressurized fluid supply unit to perform a drawing operation in a state in which the sealing body is closed and the discharge orifice is opened, and in the second suck-back step, the pressurized gas supply source is configured to operate so as to cause the incompressible fluid inside the drawing and discharging flow path to flow out through the drawing orifice toward the inside of the container.

In still another preferred embodiment of the present blow molding apparatus configured as above, before the preform is blow molded, the blow molding apparatus is configured to perform an air discharge step of supplying the incompressible fluid into the preform to thereby discharge air inside the preform to the outside, and in the air discharge step, the pressurized gas supply source is configured to operate so as to cause the incompressible fluid inside the drawing and discharging flow path to flow out through the drawing orifice toward the inside of the preform.

In still another preferred embodiment of the present blow molding apparatus configured as above, a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

Advantageous Effect

According to the present disclosure, a blow molding apparatus capable of preventing an incompressible fluid from dripping down from the blow nozzle and adhering to a molded container or the mold after blow molding can be provided.

DETAILED DESCRIPTION

Hereinafter, the present disclosure will be described in more details with reference to the drawings.

Figure 1:
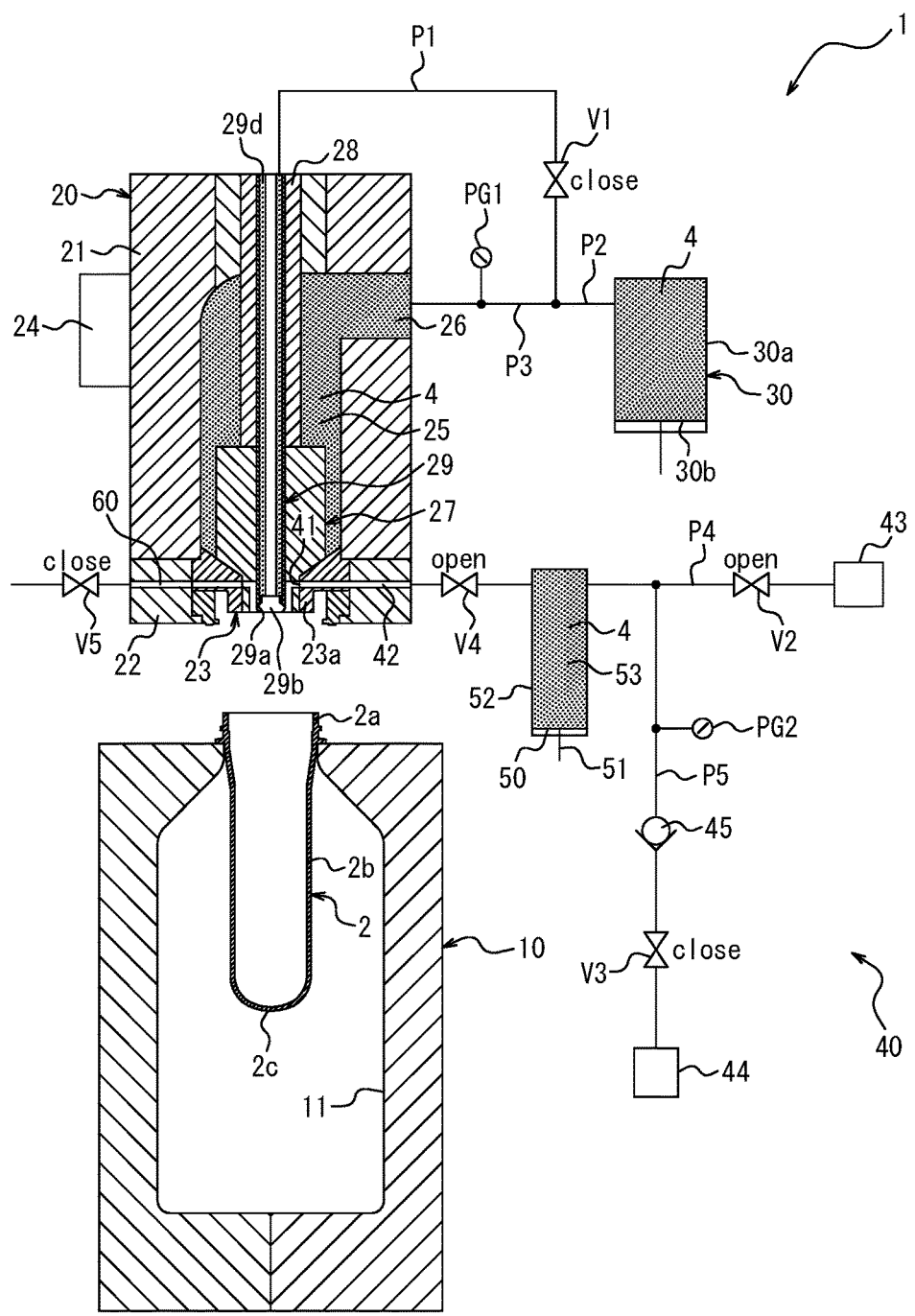
FIG. 1 schematically illustrates a configuration of a blow molding apparatus according to an embodiment of the present disclosure.

A blow molding apparatus 1 according to an embodiment of the present disclosure as illustrated FIG. 1 is configured to manufacture a container 3 (refer to FIG. 10) having a predetermined shape (e.g., bottle shape), by blow molding a synthetic resin preform 2.

In blow molding, incompressible fluids are used as pressurized media. As the incompressible fluids, for example, contents which are to be ultimately contained in the container 3, such as beverages, cosmetics, pharmaceuticals, detergents, toiletries such as shampoo, or the like can be used. In the present embodiment, a liquid 4 is used as a pressurizing medium.

As the preform 2, for example, a preform formed in a bottomed tubular shape including a cylindrical mouth 2a defining an open end, a cylindrical body 2b continuous with the mouth 2a, and a bottom 2c closing a lower end of the body 2b may be used. A thermoplastic resin material, such as polypropylene (PP) or polyethylene terephthalate (PET), may be used to form the preform 2.

Although not illustrated in detail, the mouth 2a has an outer peripheral surface provided with an engagement projection, with which a closing cap can be fitted to the mouth of the molded container 3 by plugging (undercut engagement). Additionally, the outer peripheral surface of the mouth 2a may be configured to be provided with a male screw, instead of the engagement projection for plugging, and the closing cap may be fitted onto the mouth of the container 3 by screw connection.

The blow molding apparatus 1 includes a mold 10 for blow molding. The mold 10 has a cavity 11, which has a shape corresponding to a final shape, such as a bottle shape, of the container 3. The cavity 11 is open to an upper side at an upper surface of the mold 10. The preform 2 is placed or fitted into the mold 10, with the body 2b and the bottom 2c being arranged inside the cavity 11 of the mold 10 and with the mouth 2a protruding above the mold 10.

The mold 10 is configured to be opened into left and right mold halves, for example. By opening the mold 10 into the left and right mold halves after molding the preform 2 into the container 3, the container 3 can be removed from the mold 10.

A nozzle unit 20 is provided above the mold 10, so as to supply the pressurized liquid 4 into the preform 2. The nozzle unit 20 includes a main body block 21. The main body block 21 is provided, at a lower end thereof, with a support block 22. The support block 22A supports a blow nozzle 23, which is fitted to the lower end of the main body block 21.

Figure 2:
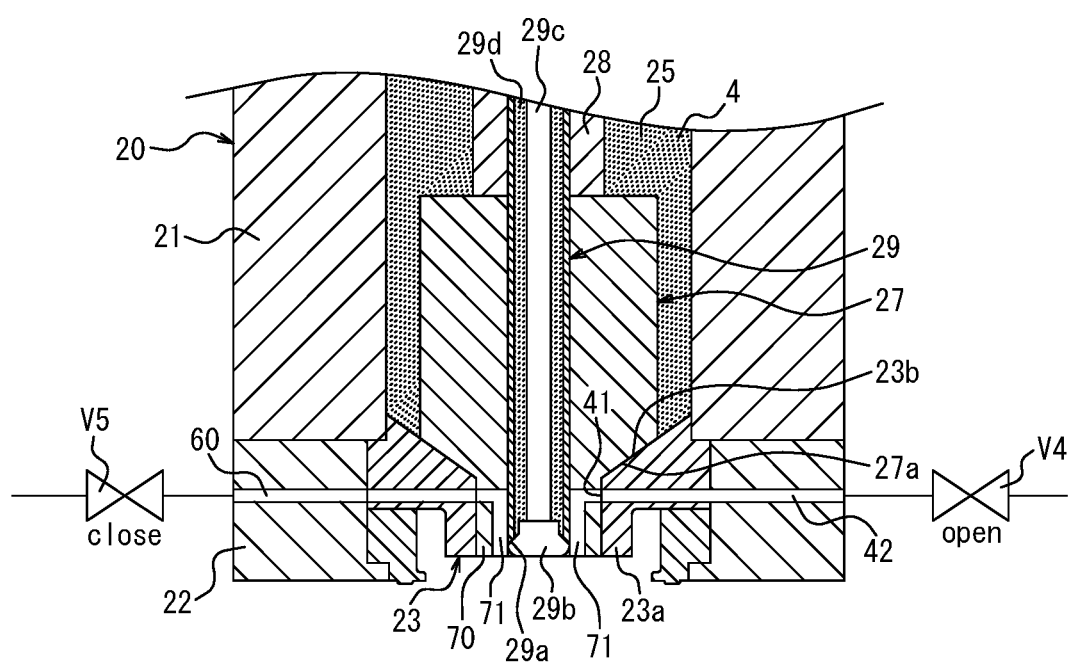
FIG. 2 is an enlarged view illustrating part of the blow molding apparatus of FIG. 1.
Figure 2:
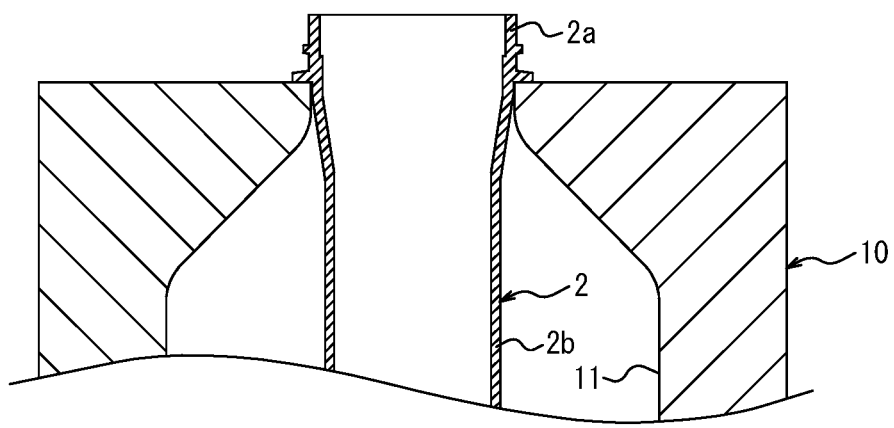

The blow nozzle 23, which is made of a steel material, a resin material, or the like, includes a nozzle tip 23a. As illustrated in FIG. 2, the nozzle tip 23a is formed in a cylindrical shape having an outer diameter smaller than an inner diameter of the mouth 2a of the preform 2. The nozzle tip 23a has a lower end surface that abuts against a step portion formed on an inner surface of the mouth 2a of the preform 2. Additionally, the outer diameter of the nozzle tip 23a may substantially be the same as the inner diameter of the mouth 2a of the preform 2, and the outer peripheral surface of the nozzle tip 23a may abut against the inner peripheral surface of the mouth 2a. By inserting the nozzle tip 23a to the mouth 2a of the preform 2, the blow nozzle 23 is connected to the mouth 2a. Further, an inverted cone shaped sealing surface 23b is provided on an upper surface of the blow nozzle 23. The shape of the sealing surface 23b can be changed as appropriate. The sealing surface 23b may be configured by an inner peripheral surface of the blow nozzle 23 or by the upper surface and the inner peripheral surface of the blow nozzle 23.

As illustrated in FIG. 1, the blow molding apparatus 1 includes a blow nozzle moving unit 24. The nozzle unit 20 (blow nozzle 23) is driven by the blow nozzle moving unit 24, so as to be movable between a connected position (the position illustrated in FIG. 4) and a standby position (the position illustrated in FIG. 1) in the vertical direction relative to the mold 10. In the connected position, the blow nozzle 23 is connected in a sealed manner to the mouth 2a of the preform 2 from above that has been placed into the mold 10. In the standby position, the blow nozzle 23 is above and away from the mouth 2a of the preform 2 that has been placed into the mold 10.

Inside the nozzle unit 20 (more specifically, the main body block 21 and the blow nozzle 23), a supply flow path 25 is provided so as to communicate with the blow nozzle 23. The supply flow path 25 extends in the vertical direction inside the nozzle unit 20. The nozzle unit 20 (more specifically, the main body block 21) is provided with a liquid supply port 26, which communicates with an upper end of the supply flow path 25.

A sealing body 27 is placed inside the supply flow path 25. The sealing body 27 can be seated on the sealing surface 23b of the blow nozzle 23. As illustrated in FIG. 2, the sealing body 27 is formed in a cylindrical shape, and it has an inverted cone shaped tapered surface 27a. The tapered surface 27a has a shape corresponding to the sealing surface 23b of the blow nozzle 23. The sealing body 27 is fixed to a shaft body 28, which is provided so as to be movable in the vertical direction relative to the nozzle unit 20. The sealing body 27 is therefore movable in the vertical direction inside the supply flow path 25. Additionally, the sealing body 27 may be formed integrally with the shaft body 28.

When the sealing body 27 is driven by the shaft body 28 and moved to a closed position, that is, a lower stroke end position, its tapered surface 27a is seated on the sealing surface 23b, to thereby close the blow nozzle 23. On the other hand, when the sealing body 27 is driven by the shaft body 28 and moved upward from the closed position, the tapered surface 27a of the sealing body 27 separates from the sealing surface 23b, to thereby open the blow nozzle 23.

The nozzle unit 20 includes a discharge rod 29. As illustrated in FIG. 2, the discharge rod 29 is provided with a discharge orifice 29a for the liquid 4. Further, an opening and closing body 29b for opening and closing the discharge orifice 29a is provided inside the discharge rod 29. In the present embodiment, the discharge rod 29 is formed in a cylindrical shape with the discharge orifice 29a provided at a lower end thereof. The opening and closing body 29b is movable in the vertical direction relative to the discharge rod 29. The opening and closing body 29b is fixed to a lower end of an opening and closing rod 29c, which extends along an axis of the discharge rod 29 on an inner side in a radial direction of the discharge rod 29. The opening and closing body 29b is therefore configured to be driven by the opening and closing rod 29c in the vertical direction, so as to be able to open and close the discharge orifice 29a. An intratubular flow path 29d is defined between an inner peripheral surface of the discharge rod 29 and an outer peripheral surface of the opening and closing rod 29c. Additionally, the discharge rod 29 may have a tubular shape (such as an elliptical cylindrical or a polygonal cylindrical shape) other than a cylindrical shape. The opening and closing rod 29c may also have a columnar shape (such as an elliptical cylindrical or a polygonal cylindrical shape) other than a cylindrical shape.

In the present embodiment, the discharge orifice 29a is provided at the lower end of the discharge rod 29. The discharge orifice 29a may, however, be provided on an outer peripheral surface of the discharge rod 29, instead of or in addition to at the lower end. Further, the number and shape of discharge orifices 29a to be provided in the discharge rod 29 can be changed as appropriate.

The discharge rod 29 passes through the sealing body 27 and extends along the axis of the sealing body 27 and the shaft body 28. The discharge rod 29 is movable in the vertical direction relative to the sealing body 27. The discharge rod 29 and the opening and closing body 29b are driven individually or in cooperation with each other by a driving source that is not illustrated.

The discharge rod 29 may be used as a stretching rod that stretches the preform 2 in the axial direction by moving downward. The discharge rod 29 may, however, be configured not to be used as a stretching rod. It is also possible to use only the opening and closing body 29b and the opening and closing rod 29c as a stretching rod.

As illustrated in FIG. 1, the discharge orifice 29a is connected to a first end of a first pipe P1 via the intratubular flow path 29d. A first opening and closing valve V1 is provided on the first pipe P1. The first opening and closing valve V1 can open and close the first pipe P1. The first opening and closing valve V1 is configured by, for example, a solenoid valve or an air valve, and it is controlled to open and close by a control means that is not illustrated.

A second end of the first pipe P1 is connected to a pressurized fluid supply unit 30 via a second pipe P2. Thus, the discharge orifice 29a is connected to the pressurized fluid supply unit 30 by a discharge path formed by the intratubular flow path 29d, the first pipe P1, and the second pipe P2.

In the present embodiment, the pressurized fluid supply unit 30 includes a cylinder 30a and a plunger 30b. The pressurized fluid supply unit 30 is configured by a plunger pump operable in both a pressurizing direction (positive direction) for pressurizing the liquid 4 and a drawing direction (opposite direction) for drawing the liquid 4. Additionally, the pressurized fluid supply unit 30, which can pressurize and draw the liquid 4, may be another type of pump or the like.

The pressurized fluid supply unit 30 is connected to the liquid supply port 26 via the second pipe P2 and a third pipe P3. That is, the pressurized fluid supply unit 30 is connected to the blow nozzle 23 via the second pipe P2, the third pipe P3, the liquid supply port 26, and the supply flow path 25. The pressurized fluid supply unit 30 can supply the pressurized liquid 4 (incompressible fluid) to the blow nozzle 23, by operating in the pressurizing direction. The liquid 4 is replenished to the pressurized fluid supply unit 30 from a tank that is not illustrated, as needed. A pressure gauge PG1 is provided on the third pipe P3, and measurement data of the pressure gauge PG1 is inputted to the aforementioned control means.

In the blow molding apparatus 1, the blow nozzle 23 is connected to the mouth 2a of the preform 2 that has been placed into the mold 10, with the nozzle unit 20 serving as a connected position. In this state, the sealing body 27 is opened, and the pressurized liquid 4 is supplied from the pressurized fluid supply unit 30 to the blow nozzle 23, whereby the pressurized liquid 4 is supplied into the preform 2 through the blow nozzle 23. The preform 2 can be thus blow molded into the container 3 having a shape corresponding to the cavity 11 of the mold 10.

As illustrated in FIG. 1, the blow molding apparatus 1 includes a fluid drawing and flowing out mechanism 40. The fluid drawing and flowing out mechanism 40 includes a drawing and discharging flow path 42 communicating with a drawing orifice 41, a fluid drawing source 43 connected to the drawing and discharging flow path 42 via a fourth pipe P4, and a pressurized gas supply source 44 connected to the drawing and discharging flow path 42 via a fifth pipe P5.

As illustrated in FIG. 2, for example, the drawing orifice 41 may be configured to open to the inner peripheral surface of the nozzle tip 23a in part of the blow nozzle 23 that is located downstream of the sealing surface 23b. Although in the present embodiment the drawing orifice 41 is open to the inner peripheral surface of the nozzle tip 23a of the blow nozzle 23, the drawing orifice 41 may be provided so as to open at another part of the nozzle tip 23a of the blow nozzle 23 other than the inner peripheral surface (e.g., the lower end surface of the nozzle tip 23a). Further, the drawing orifice 41 may be provided on a member, such as a pipe material, different from the blow nozzle 23, and it may be configured to be placed below the blow nozzle 23 when the blow nozzle 23 is set to the standby position.

The drawing and discharging flow path 42 communicates with the drawing orifice 41. The drawing and discharging flow path 42 also extends from the inside of the blow nozzle 23 and the support block 22 to the outside, so as to be connected to the fourth pipe P4 and the fifth pipe P5.

Additionally, the number of drawing orifices 41 and the number of drawing and discharging flow paths 42 are not limited to one. An annular continuous groove may be provided on an outer peripheral surface of the blow nozzle 23 that faces an inner peripheral surface of the support block 22. A plurality of drawing and discharging flow paths 42, each communicating with the continuous groove, may be provided on the blow nozzle 23 so as to be arranged radially and at intervals in the circumferential direction. A plurality of drawing orifices 41 may be configured to be open to the inner peripheral surface of the nozzle tip 23a.

A second opening and closing valve V2 is provided on the fourth pipe P4. The second opening and closing valve V2 can open and close the fourth pipe P4. A third opening and closing valve V3 is provided on the fifth pipe P5. The third opening and closing valve V3 can open and close the fifth pipe P5. The second opening and closing valve V2 and the third opening and closing valve V3 are configured by, for example, a solenoid valve or an air valve, and they are controlled to open and close by a control means that is not illustrated.

Further, a pressure gauge PG2 and a check valve 45 are provided on the fifth pipe P5. Measurement data of the pressure gauge PG2 is inputted to the aforementioned control means.

The fluid drawing source 43 may be configured by, for example, a drawing pump or the like. After blow molding is completed, and after the blow nozzle 23 is moved from the connected position to the standby position while the sealing body 27 is closed, the fluid drawing source 43 applies drawing force to the drawing and discharging flow path 42. The fluid drawing source 43 thus operates so as to draw the liquid 4 adhering to the blow nozzle 23 into the drawing and discharging flow path 42. It is to be noted that drawing force may be applied to the drawing and discharging flow path 42 during movement from the connected position to the standby position, without being limited to after completion of movement to the standby position. The operation of the fluid drawing source 43 is controlled by the aforementioned control means.

The pressurized gas supply source 44 may be configured, for example, by a pressurizing pump or the like. After blow molding is completed and after the next preform 2 is placed into the mold 10, the pressurized gas supply source 44 supplies a pressurized gas to the drawing and discharging flow path 42. The pressurized gas supply source 44 thus operates so as to cause the liquid 4 that has been drawn into the drawing and discharging flow path 42 by the fluid drawing source 43 to flow out though the drawing orifice 41 toward the inside of the preform 2 or toward the inside of a container 3 into which the preform 2 is to be blow molded. The operation of the pressurized gas supply source 44 is controlled by the aforementioned control means.

Additionally, a drawing and pressurizing pump (e.g., a plunger pump) in which a drawing pump and a pressurizing pump are integrated may be connected to the drawing and discharging flow path 42. The drawing and pressurizing pump may be configured to function as the fluid drawing source 43 and the pressurized gas supply source 44.

A fourth opening and closing valve V4 is provided on the drawing and discharging flow path 42. The fourth opening and closing valve V4 can open and close the drawing and discharging flow path 42. The fourth opening and closing valve V4 is configured by, for example, a solenoid valve or an air valve, and it is controlled to open and close by a control means that is not illustrated.

Figure 3:
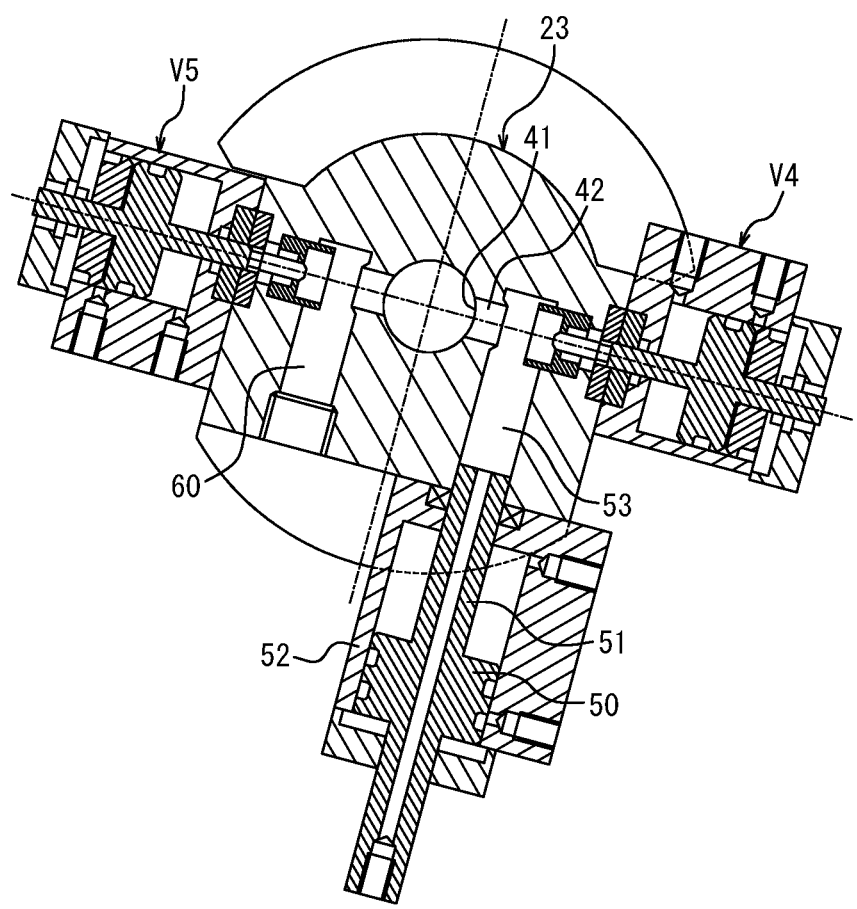
FIG. 3 is a sectional view illustrating details of a piston member.

The fluid drawing and flowing out mechanism 40 may be configured with a piston member 50 that is located closer to the fluid drawing source 43 or the pressurized gas supply source 44 than to the fourth opening and closing valve V4 on the drawing and discharging flow path 42. As illustrated in FIG. 3, the piston member 50 is provided integrally with a shaft body 51, which is provided on an axis thereof with a through hole that communicates with the drawing and discharging flow path 42. The piston member 50 can make advancing and retracting movements in a cylinder 52 along the drawing and discharging flow path 42. The advancing and retracting movements of the piston member 50 are driven by a working fluid supplied to the cylinder 52.

Figure 11:
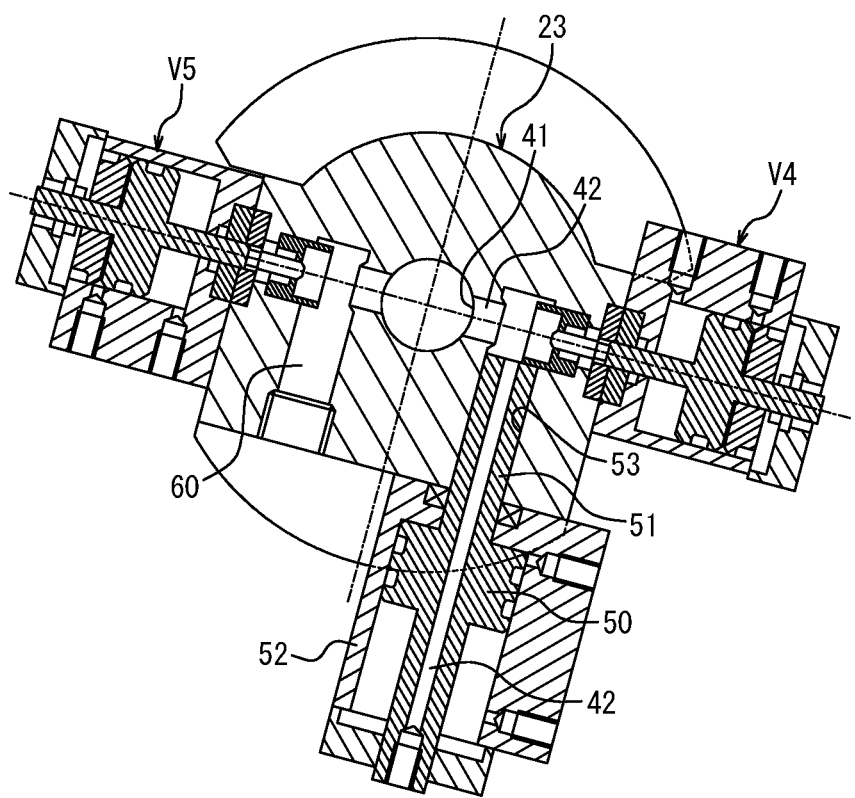
FIG. 11 is a sectional view illustrating details of the piston member wherein the fluid drawing step has been performed.

When the fluid drawing source 43 is operated, the piston member 50 performs a pull operation in a direction from the fourth opening and closing valve V4 toward the fluid drawing source 43 or the pressurized gas supply source 44. Consequently, a majority of the shaft body 51 is moved out of the drawing and discharging flow path 42 into the cylinder 52, so as to increase a storage space 53 formed inside the drawing and discharging flow path 42 for storing the liquid 4 (as in the state illustrated in FIG. 3). Further, when the pressurized gas supply source 44 is operated, the piston member 50 performs a push operation in a direction from the fluid drawing source 43 or the pressurized gas supply source 44 toward the fourth opening and closing valve V4. Consequently, the shaft body 51 is moved to protrude out of the cylinder 52 along an inner peripheral surface of the drawing and discharging flow path 42, so as to reduce the storage space 53 (as in the state illustrated in FIG. 11). By moving the shaft body 51 to protrude out of the cylinder 52 along the inner peripheral surface of the drawing and discharging flow path 42, the liquid 4 adhering to the inner peripheral surface of the storage space 53 can be pushed toward the drawing orifice 41 by the shaft body 51.

As illustrated in FIG. 1, an open flow path 60 that is open to the atmosphere is provided inside the blow nozzle 23 and the support block 22. A fifth opening and closing valve V5 is provided on the open flow path 60. The fifth opening and closing valve V5 can open and close the open flow path 60. The fifth opening and closing valve V5 is configured by, for example, a solenoid valve or an air valve, and it is controlled to open and close by a control means that is not illustrated.

Figure 10:
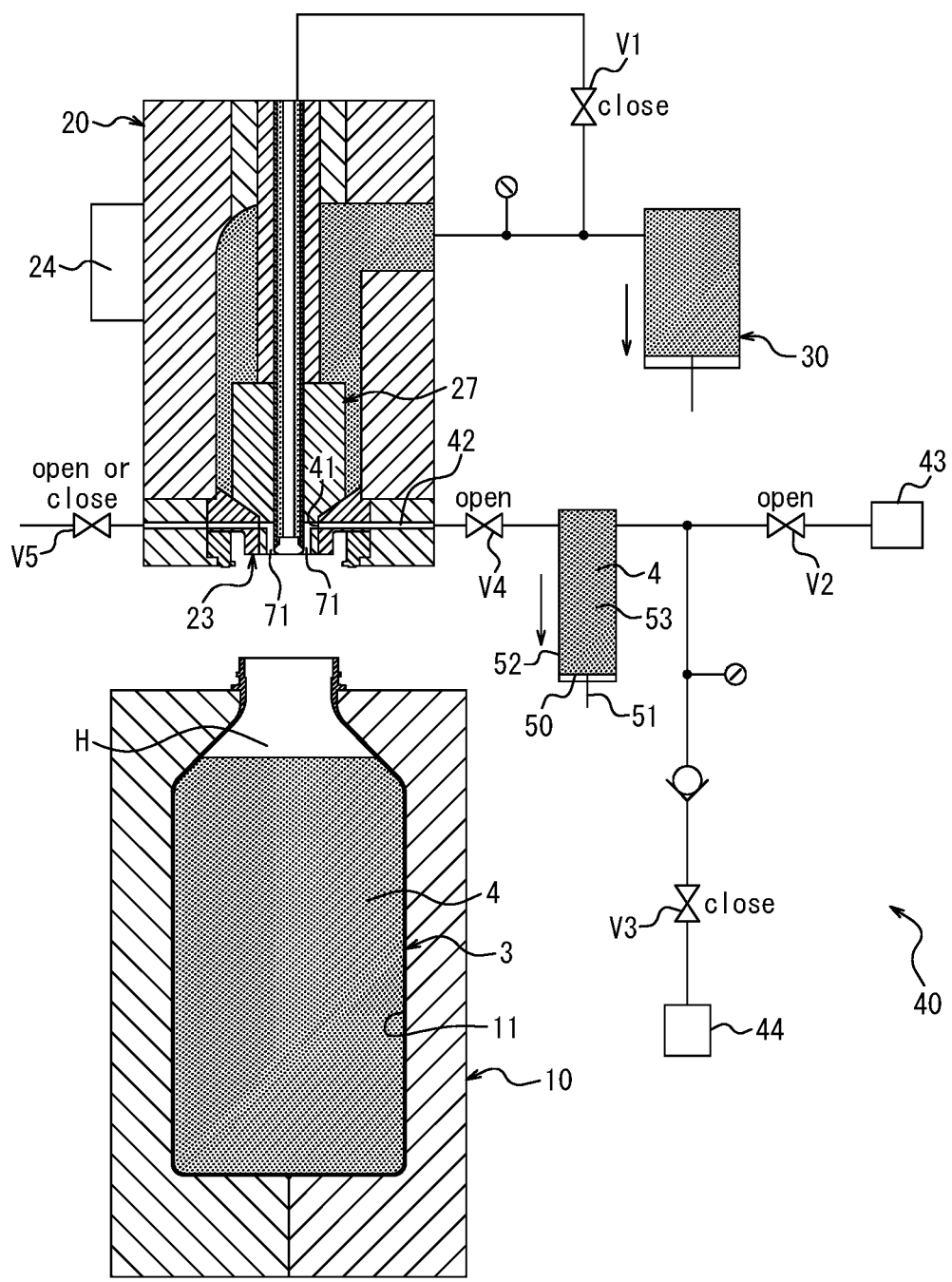
FIG. 10 schematically illustrates the configuration of the blow molding apparatus in a state in which a fluid drawing step is being performed.

After blow molding is completed, the blow nozzle 23 is moved from the connected position to the standby position by the blow nozzle moving unit 24, while the sealing body 27 is closed. After and/or during the movement, as illustrated in FIG. 10, the fluid drawing and flowing out mechanism 40 operates the fluid drawing source 43 and also causes the piston member 50 to perform a pull operation, in a state in which the first opening and closing valve V1 and the third opening and closing valve V3 are closed, the second opening and closing valve V2 and the fourth opening and closing valve V4 are opened, and the fifth opening and closing valve V5 is opened or closed. Consequently, the liquid 4 adhering to the blow nozzle 23 can be drawn into the drawing and discharging flow path 42 through the drawing orifice 41 and stored in the storage space 53.

Figure 9:
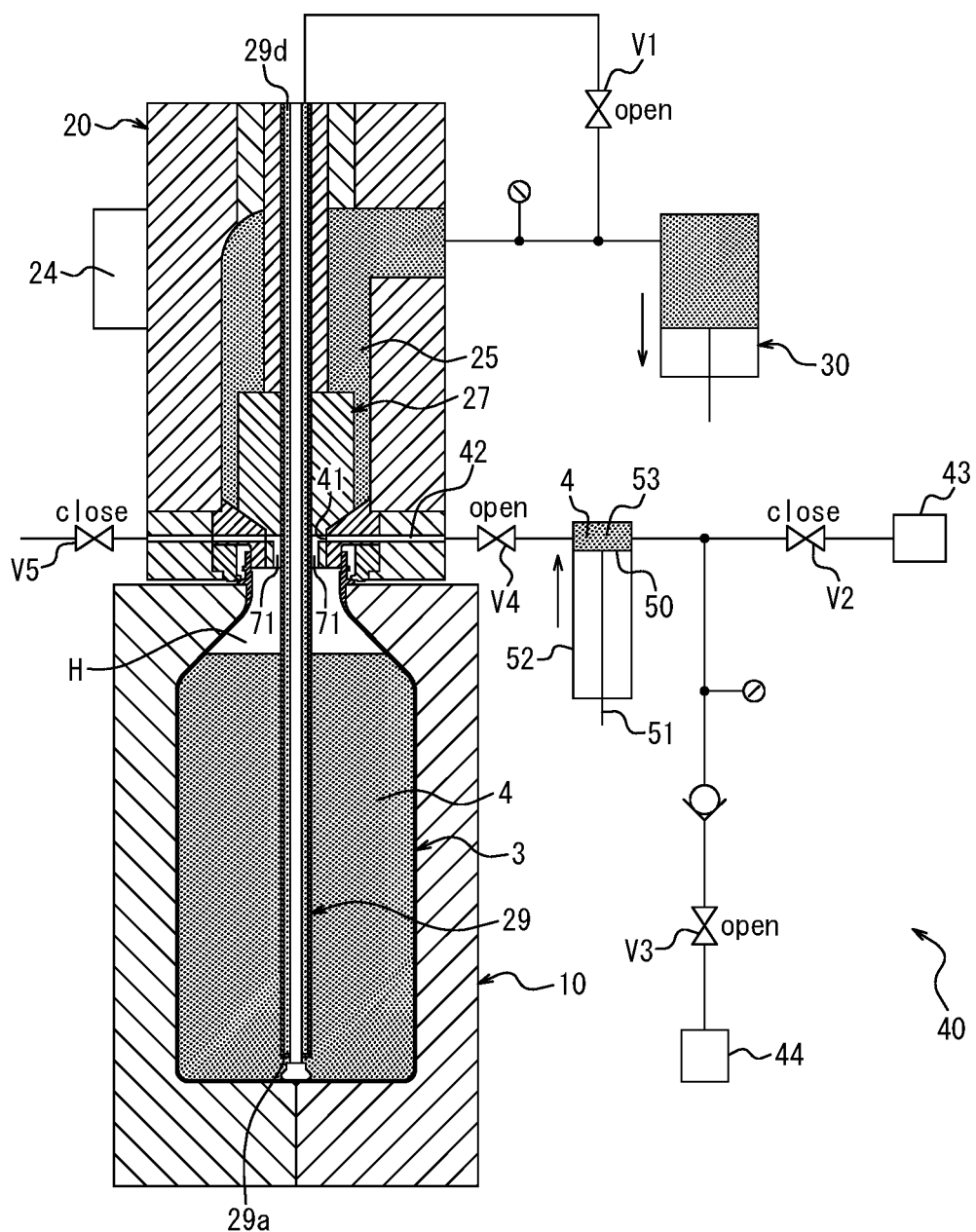
FIG. 9 schematically illustrates the configuration of the blow molding apparatus in a state in which a second suck-back step and a fluid flow out step are being performed.

Further, after blow molding is completed, and after the blow molded container 3 is removed from the mold 10 and the next preform 2 is placed into the mold 10 (specifically, after the next preform 2 is placed into the mold 10 and before a container 3 into which the preform 2 is to be blow molded is removed from the mold 10), as illustrated in FIG. 9, the fluid drawing and flowing out mechanism 40 operates the pressurized gas supply source 44 in a state in which the first opening and closing valve V1, the third opening and closing valve V3, and the fourth opening and closing valve V4 are opened, and the second opening and closing valve V2 and the fifth opening and closing valve V5 are closed. Consequently, the liquid 4 stored in the storage space 53 can be pushed out by a pressurized gas, so as to flow out through the drawing orifice 41 toward the inside of the preform 2 or toward the inside of the container 3 into which this preform 2 is to be blow molded. At this time, the piston member 50 is caused to perform a pull operation, so that the liquid 4 adhering to the inner peripheral surface of the storage space 53 can be pushed out toward the drawing orifice 41 by the shaft body 51. Thus, it is ensured that the liquid 4 can flow out through the drawing orifice 41 without remaining in the storage space 53.

As illustrated in FIG. 2, the sealing body 27 includes a tubular wall 70 that is placed inside the blow nozzle 23 when the sealing body 27 is closed. The tubular wall 70 may be configured to be provided, on an inner peripheral surface thereof, with a communication groove 71 that extends upward from a lower end of the tubular wall 70 and that communicates with the drawing orifice 41 when the sealing body 27 is closed. In this case, the tubular wall 70 may also be configured to be provided, on the inner peripheral surface, with a plurality of communication grooves 71 arranged at intervals in the circumferential direction.

The tubular wall 70 may be configured to include an outer peripheral surface that faces the inner peripheral surface of the nozzle tip 23a of the blow nozzle 23 with a slight gap therebetween. The outer peripheral surface of the tubular wall 70 may also be configured to be in sliding contact with the inner peripheral surface of the nozzle tip 23a of the blow nozzle 23. Additionally, the outer peripheral surface of the discharge rod 29 is in sliding contact with the inner peripheral surface of the tubular wall 70.

The blow molding apparatus 1 is configured to blow mold a synthetic resin preform 2 into a container 3 having a predetermined shape (liquid-containing container 3 in which a liquid 4 is contained), by performing the following operations.

First, the blow molding apparatus 1 performs a standby step. In the standby step, as illustrated in FIG. 1, the blow nozzle 23 is in a standby position in which it is located above and away from the mouth 2a of the preform 2 which has been placed into the mold 10, the sealing body 27 closes the blow nozzle 23, and the discharge orifice 29a of the discharge rod 29 is in a state of being closed by the opening and closing body 29b.

In the standby step, the preform 2 has been heated to a predetermined temperature around which stretchability can be achieved using a heating means (not illustrated), such as a heater, in advance. The preform 2 is placed into the mold 10, and the mold 10 is closed. At this time, because the mouth 2a of the preform 2 is open, the preform 2 is in a state of being filled with air.

Figure 4:
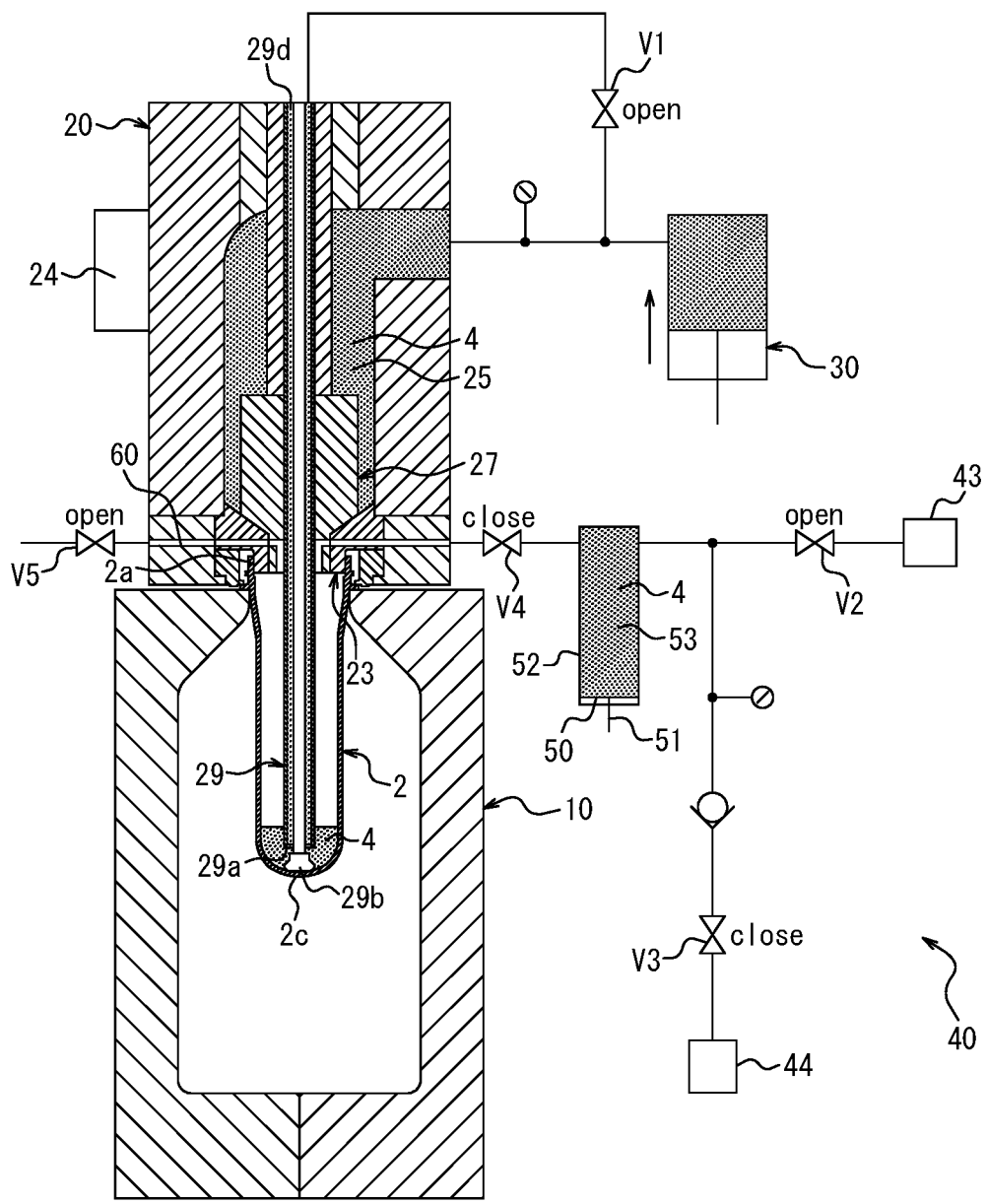
FIG. 4 schematically illustrates the configuration of the blow molding apparatus in a state in which an air discharge step is being performed.

Secondly, an air discharge step is performed in the present embodiment. In the air discharging step, as illustrated in FIG. 4, the nozzle unit 20 is lowered, the blow nozzle 23 is set to the connected position in which it is connected to the mouth 2a of the preform 2, and the fifth opening and closing valve V5 is opened to thereby set the open flow path 60 to an exposed-to-atmosphere state. Then, the discharge rod 29 is lowered so that the discharge orifice 29a is open at the bottom 2c of the preform 2, while the blow nozzle 23 remains closed by the sealing body 27. Further, the first opening and closing valve V1 is set to the open state. In this state, the pressurized fluid supply unit 30 is operated in the pressurizing direction, so as to supply the liquid 4 into the preform 2 through the discharge orifice 29a. The pressure of the liquid 4 that is supplied into the preform 2 by the pressurized fluid supply unit 30 in the air discharge step is preferably set to a level that does not substantially stretch (expand) the preform 2. Additionally, a discharge path for air can also be achieved by not engaging the blow nozzle 23 with the mouth 2a of the preform 2, instead of discharging air inside the preform 2 through the open flow path 60.

Figure 5:
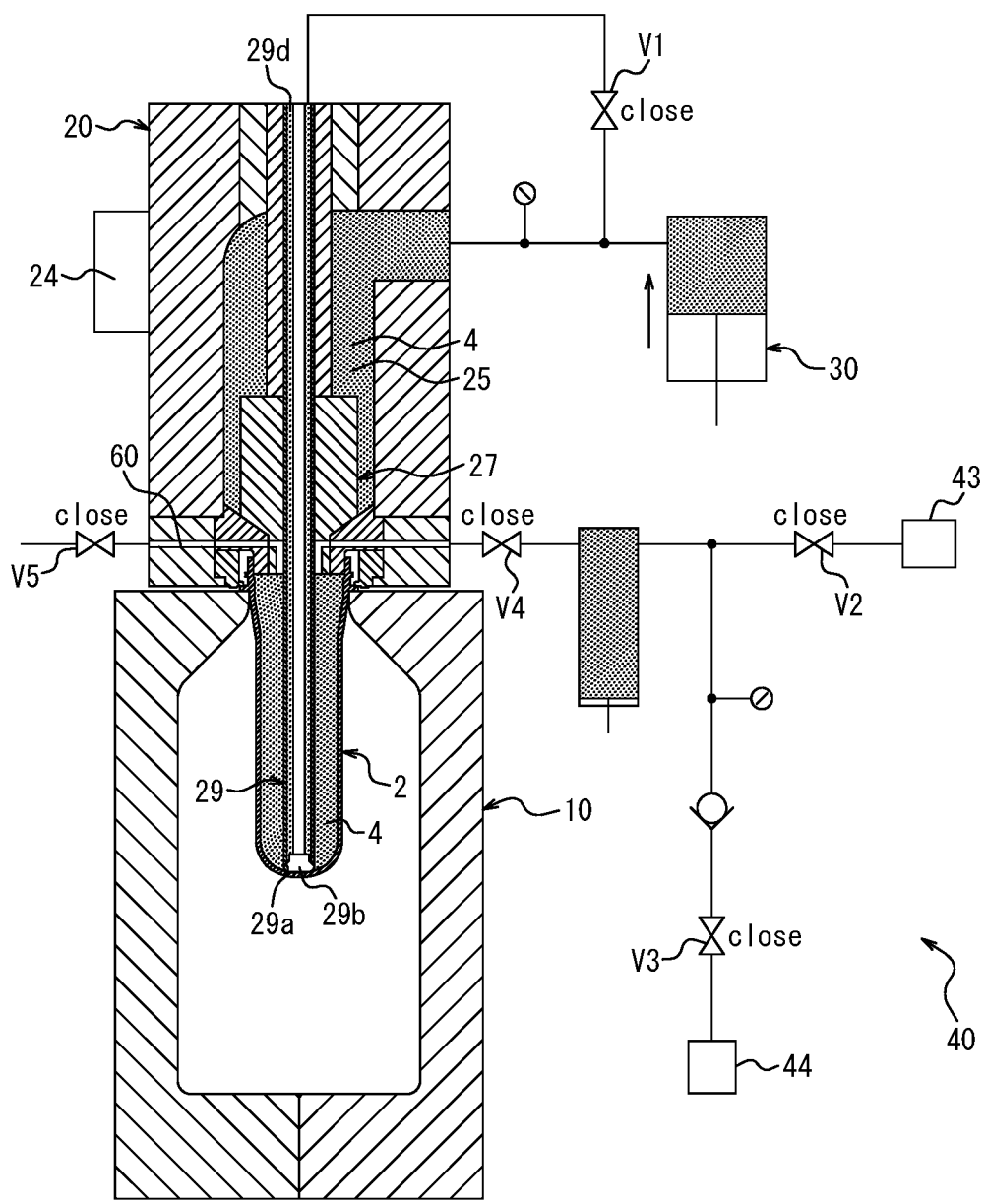
FIG. 5 schematically illustrates the configuration of the blow molding apparatus in a state in which the air discharge step is completed.

When the air discharge step is completed, as illustrated in FIG. 5, air inside the preform 2 has been discharged to the atmosphere (outside) through the open flow path 60, so that the air inside the preform 2 is replaced by the liquid 4. When the air discharge step is completed, the discharge orifice 29a, the first opening and closing valve V1, and the fifth opening and closing valve V5 are closed.

Thus, in the air discharging step, the liquid 4 is supplied through the discharge orifice 29a of the discharge rod 29, rather than being supplied into the preform 2 by opening the blow nozzle 23 by the sealing body 27. Consequently, the liquid 4 is prevented from entering the inner peripheral surface of the blow nozzle 23, and air can be smoothly discharged out of the preform 2 through the open flow path 60. Further, in the air discharge step, the liquid 4 is supplied in a state in which the discharge orifice 29a is positioned at the bottom 2c of the preform 2. This allows the discharge orifice 29a to be immersed in the liquid 4 immediately after it is supplied, and further liquid 4 can be supplied inside the liquid 4. This can effectively prevent entrainment of air that causes bubbles or the like to be formed in the liquid 4 filled into the preform 2. The prevention of entrainment can in turn prevent air entrainment into the liquid 4 inside a container 3 that is to be formed by a later-described blow molding step. Accordingly, a headspace having a desired size can be reliably formed in a later-described suck-back step. Further, the prevention of entrainment can also reduce the number of bubbles contained in the liquid 4 that will be returned into the nozzle unit 20 in the suck-back step. Accordingly, air entrainment into the supply flow path 25 can also be prevented, and stability of molding conditions, moldability of the container 3, or the like can be improved.

Additionally, the air discharging step can be performed by supplying the liquid 4 by opening the blow nozzle 23 by the sealing body 27, instead of thus supplying the liquid 4 through the discharge orifice 29*a* of the discharge rod 29. Further, the air discharge step may also be omitted.

Figure 6:
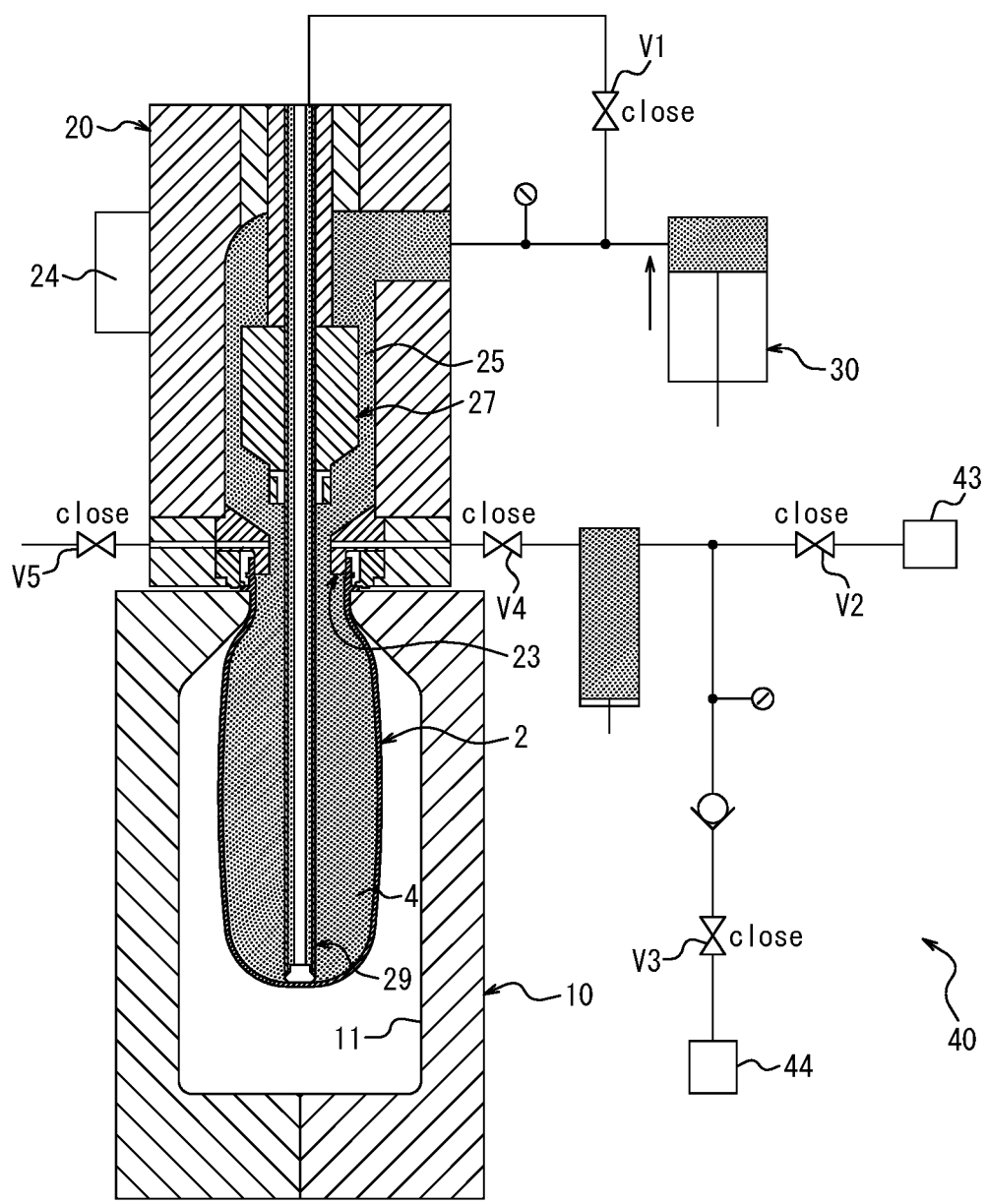
FIG. 6 schematically illustrates the configuration of the blow molding apparatus in a state in which a blow molding step is being performed.
Figure 7:
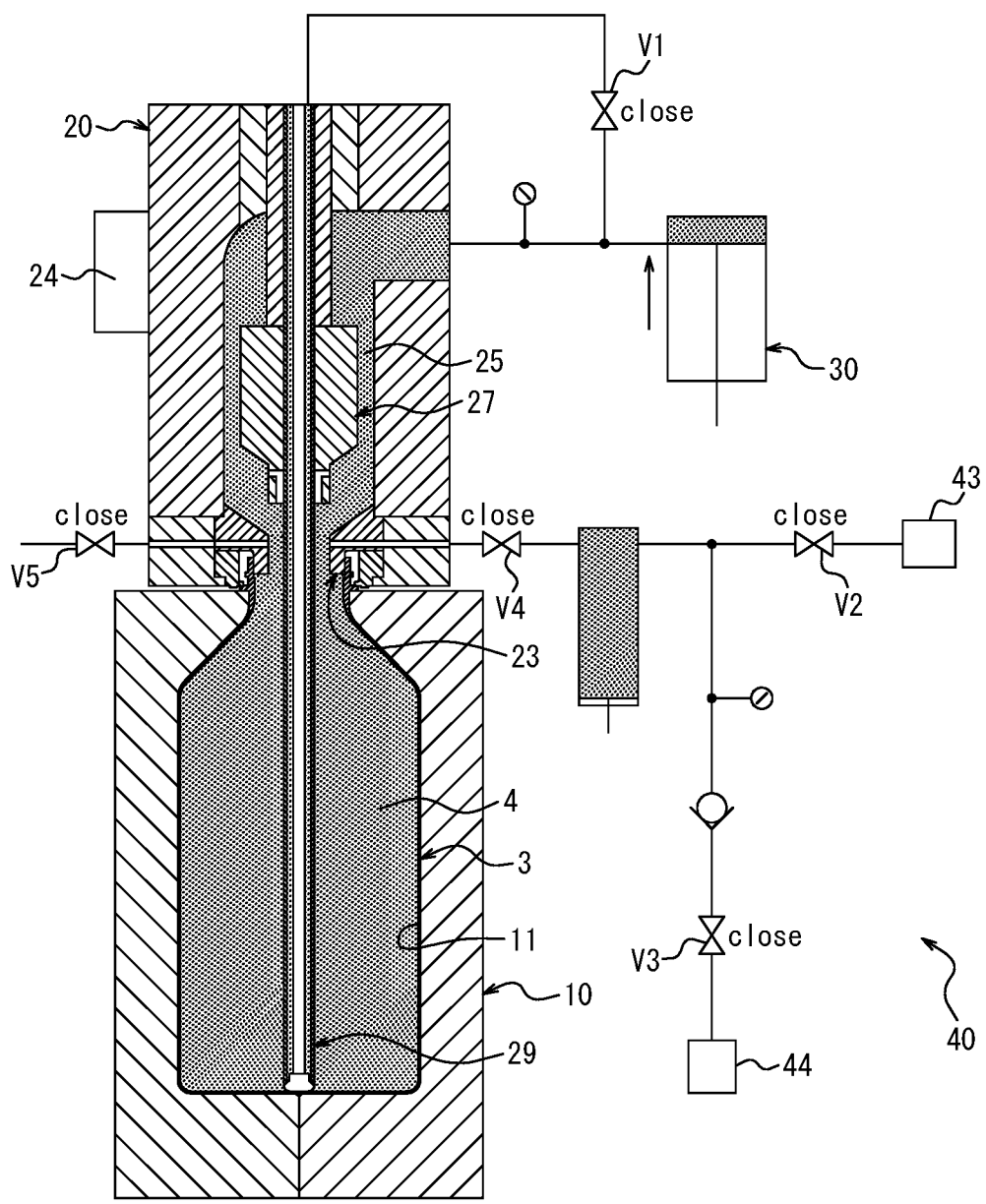
FIG. 7 schematically illustrates the configuration of the blow molding apparatus in a state in which the blow molding step is completed.

Upon completion of the air discharge step, the blow molding step is subsequently performed. In the blow molding step, as illustrated in FIG. 6, the blow nozzle 23 is in a state of engaging with the mouth 2*a* of the preform 2. In this state, the pressurized fluid supply unit 30 is operated, and the sealing body 27 is opened so as to release the blow nozzle 23, so that the pressurized liquid 4 is supplied into the preform 2 through the blow nozzle 23. Thus, the preform 2 is stretched by the pressure of the liquid 4, and as illustrated in FIG. 7, it is blow molded into a container 3 containing the liquid 4 and having a shape corresponding to the cavity 11 of the mold 10.

Additionally, in the present embodiment, the discharge orifice 29*a* is in a state of being closed in the blow molding step. The discharge orifice 29*a* may, however, be configured to be in an open state, so as to supply the liquid 4 into the preform 2 further through it.

Further, in the blow molding step, the body 2*b* of the preform 2 may be stretched in the axial direction (longitudinal direction) by the discharge rod 29, by moving the discharge rod 29 downward. In this case, biaxially stretch blow molding can be performed in which the preform 2 is blow molded while being stretched in the axial direction by the discharge rod 29. Consequently, the preform 2 can be molded into a container 3 having a predetermined shape with even higher accuracy.

The blow molding step is performed in a state in which a majority of air in the preform 2 has been discharged to the outside by the air discharge step. Accordingly, when the pressurized liquid 4 is supplied into the preform 2, the liquid 4 does not entrain air, and therefore, entrainment of air into the liquid 4 inside the container 3 is prevented.

Figure 8:
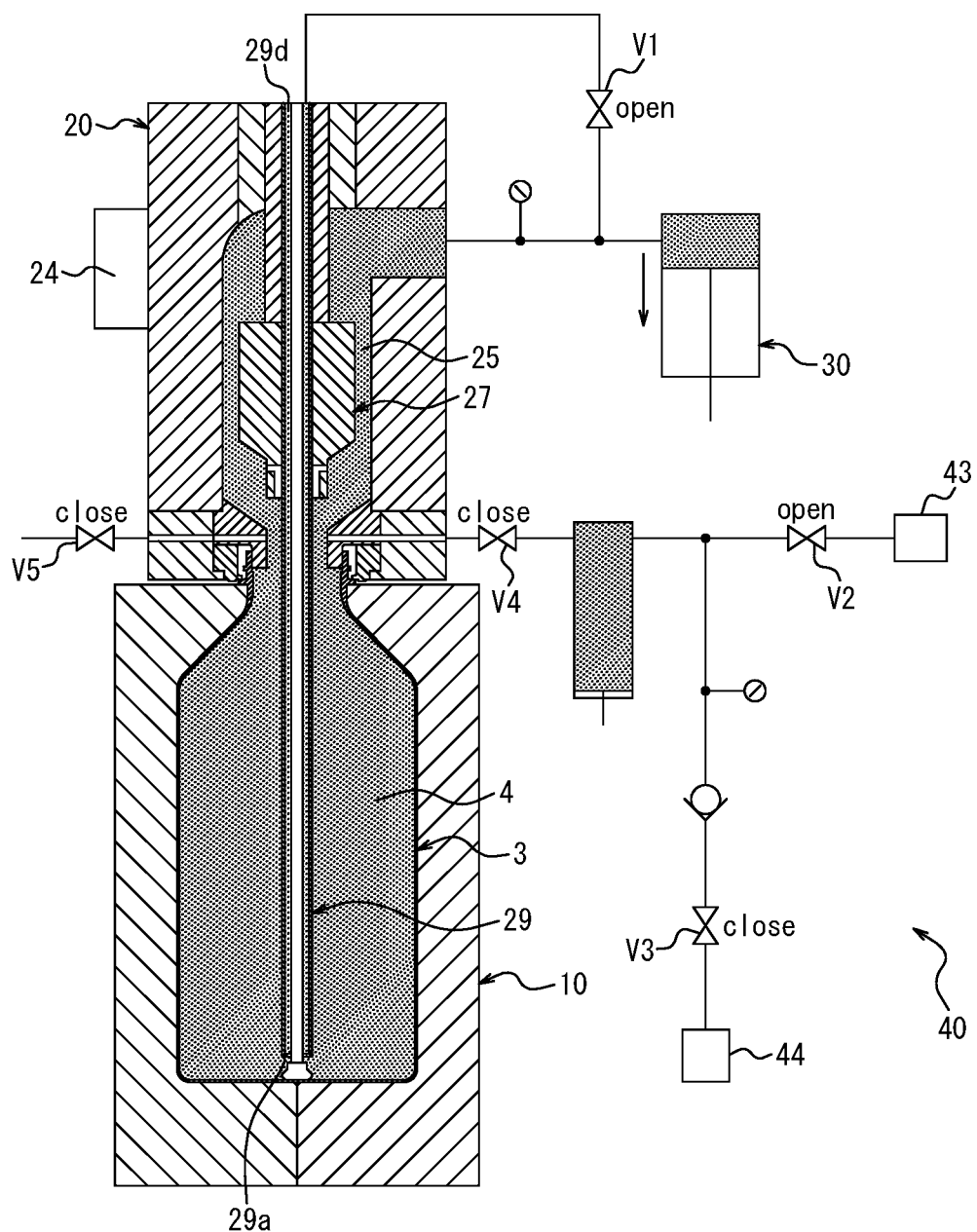
FIG. 8 schematically illustrates the configuration of the blow molding apparatus in a state in which a first suck-back step is being performed.

Upon completion of the blow molding step, the suck-back step is subsequently performed. In the present embodiment, the suck-back step is configured to include a first suck-back step and a second suck-back step performed after the first suck-back step. In the first suck-back step, as illustrated in FIG. 8, in a state in which the discharge rod 29 extends to the bottom of the container 3, the sealing body 27, the discharge orifice 29*a*, and the first opening and closing valve V1 are set to open states. In this state, the pressurized fluid supply unit 30 is caused to perform a drawing operation, so that a predetermined amount of the liquid 4 is sucked back from the inside of the container 3 toward the supply flow path 25 and the intratubular flow path 29*d* (discharge path). In the second suck-back step, as illustrated in FIG. 9, the sealing body 27 is closed, while the discharge orifice 29*a* and the first opening and closing valve V1 remain in the open states, and the pressurized fluid supply unit 30 is caused to perform a drawing operation, so that a predetermined amount of the liquid 4 is sucked back from the inside of the container 3 toward the intratubular flow path 29*d* (discharge path). Due to the sack-back step, a predetermined amount of the liquid 4 is discharged out of the container 3, whereby a headspace H having a desired size is formed in the container 3. For example, the first suck-back step may be performed to the extent where the pressurized state in the container 3 is released, and the second suck-back step may be set so as to substantially form the headspace H.

Further, in the present embodiment, in the second suck-back step, the pressurized gas supply source 44 is operated in a state in which the third opening and closing valve V3 and the fourth opening and closing valve V4 are opened. Accordingly, when the pressurized gas supply source 44 is operated, a pressurized gas is supplied into the container 3 via the drawing orifice 41 and the communication grooves 71 through the drawing and discharging flow path 42. The pressure of the gas pushes the liquid 4 to be effectively discharged out of the container 3 through the intratubular flow path 29*d* (discharge path). In this way, in the second suck-back step, the pressurized gas supply source 44 is configured to supply a pressurized gas into the container 3. Consequently, suck-back is assisted, and the time required for the second suck-back step can be reduced.

Further, in the second suck-back step, when the pressurized gas supply source 44 is operated, the piston member 50 performs a push operation in a direction from the fluid drawing source 43 or the pressurized gas supply source 44 toward the fourth opening and closing valve V4. When the piston member 50 performs the push operation, the shaft body 51 moves and protrudes out of the cylinder 52 along the inner peripheral surface of the drawing and discharging flow path 42, so as to reduce the storage space 53 (as in the state illustrated in FIG. 11). By thus causing the shaft body 51 to move and protrude out of the cylinder 52 along the inner peripheral surface of the drawing and discharging flow path 42, the liquid 4 adhering to the inner peripheral surface of the storage space 53 can be pushed toward the drawing orifice 41 by the shaft body 51.

Additionally, the blow molding apparatus 1 may be configured to perform only one of the first suck-back step and the second suck-back step as the suck-back step, or it may be configured not to perform the suck-back step.

Upon completion of the second suck-back step, as illustrated in FIG. 10, the discharge orifice 29*a* and the first opening and closing valve V1 are closed, the discharge rod 29 is raised and returned to the original position, and the nozzle unit 20 is raised to the standby position.

When the nozzle unit 20 has moved to the standby position, the liquid 4 adhering to the surface of the blow nozzle 23 can drip down. In the blow molding apparatus 1 according to the present embodiment, however, when the nozzle unit 20 has moved to the standby position, the fluid drawing source 43 is operated in a state as illustrated in FIG. 10 in which the first opening and closing valve V1 and the third opening and closing valve V3 are closed, the second opening and closing valve V2 and the fourth opening and closing valve V4 are opened, and the fifth opening and closing valve V5 is opened or closed. Accordingly, the liquid 4 adhering to the blow nozzle 23 can be drawn into the drawing and discharging flow path 42 through the drawing orifice 41, thus being prevented from dripping down. After blow molding, the liquid 4 is therefore prevented from dripping from the blow nozzle 23 and adhering to the molded container 3 or the mold 10.

Further, in the present embodiment, after the liquid 4 adhering to the blow nozzle 23 has been drawn into the drawing and discharging flow path 42 through the drawing orifice 41 by operating the fluid drawing source 43, another second suck-back step is performed in a process in which the next preform 2 placed into the mold 10 is molded into a container 3. During this time, the pressurized gas supply source 44 is operated in a state in which the first opening and closing valve V1, the third opening and closing valve V3, and the fourth opening and closing valve V4 are open, and the second opening and closing valve V2 and the fifth opening and closing valve V5 are closed. By doing so, the liquid 4 which has been drawn into the drawing and discharging flow path 42 is pushed out by a pressurized gas and flows out toward the inside of the container 3 through the drawing orifice 41, so as to return into the container 3. Loss of the liquid 4 can therefore be prevented, by not discharging the liquid 4 to the outside after it has been drawn into the drawing and discharging flow path 42.

Thus, in the blow molding apparatus 1 according to the present embodiment, after blow molding is completed and when the blow nozzle 23 is moved from the connected position to the standby position, the fluid drawing source 43 is operated so as to apply drawing force to the drawing and discharging flow path 42. By doing so, the liquid (incompressibility fluid) 4 that adheres to the blow nozzle 23 during blow molding can be drawn into the drawing and discharging flow path 42. Consequently, the liquid (incompressible fluid) 4 adhering to the blow nozzle 23 is prevented from dripping down and adhering to the molded container 3 or the mold 10.

Further, in the blow molding apparatus 1 according to the present embodiment, after blow molding is completed and the next preform 2 is placed into the mold 10, the pressurized gas supply source 44 is operated. By doing so, the liquid (incompressible fluid) 4 that has been drawn into the drawing and discharging flow path 42 by the fluid drawing source 43 is pushed out by a pressurized gas, so as to be returned through the drawing orifice 41 into the preform 2 or a container 3 that is to be formed by blow molding the preform 2. Thus, even with a configuration in which the liquid adhering to the blow nozzle 23 is drawn into the drawing and discharging flow path 42 and therefore prevented from dripping down, loss of the liquid 4 can be prevented by not discharging the liquid 4 to the outside after it has been drawn into the drawing and discharging flow path 42.

In the blow molding apparatus 1 according to the present embodiment, the drawing orifice 41 is configured to open to the blow nozzle 23. For this reason, when the fluid drawing source 43 is operated, the liquid (incompressible fluid) 4 adhering to the blow nozzle 23 can be more efficiently drawn into the drawing and discharging flow path 42.

Further, in the blow molding apparatus 1 according to the present embodiment, the sealing body 27 includes the tubular wall 70 that is placed inside the blow nozzle 23 when the sealing body 27 is closed. Further, the tubular wall 70 is provided, on the inner peripheral surface thereof, with the communication grooves 71 that extend upward from the lower end of the tubular wall 70 and that communicate with the drawing orifice 41 when the sealing body 27 is closed. For this reason, in addition to the liquid (incompressibility fluid) 4 that adheres to the blow nozzle 23, the liquid (incompressible fluid) 4 that adheres to the outer peripheral surface of the discharge rod 29 during blow molding and then adheres to the lower end of the sealing body 27 by being drawn through the inner peripheral surface of the sealing body 27 when the discharge rod 29 is raised can be effectively drawn into the drawing and discharging flow path 42. Thus, the liquid (incompressible fluid) 4 can be more reliably prevented from dripping down and adhering to the molded container 3 and the mold 10 after blow molding.

Moreover, in the blow molding apparatus 1 according to the present embodiment, the piston member 50 is configured to perform a push operation when the liquid 4 that has been drawn into the drawing and discharging flow path 42 is pushed out by a pressurized gas. For this reason, by pushing the liquid 4 adhering to the inner peripheral surface of the storage space 53 toward the drawing orifice 41 by the shaft body 51, it is further ensured that the liquid 4 is returned into the container 3 without remaining in the storage space 53.

Needless to say, the present disclosure is not limited to the above embodiment, and various changes may be made without departing from the gist of the present disclosure.

For example, although in the above embodiment the liquid 4 that has been drawn into the drawing and discharging flow path 42 by operating the fluid drawing source 43 is returned into the container 3 in the second suck-back step, the present disclosure is not limited to this example. For example, the pressurized gas supply source 44 may be configured to operate during the air discharge step illustrated in FIG. 4, in a state in which the second opening and closing valve V2 is closed and the third opening and closing valve V3 and the fourth opening and closing valve V4 are opened, so that the liquid 4 that has been drawn into the drawing and discharging flow path 42 (storage space 53) is pushed out by a pressurized gas and/or the shaft body 51 and flow out toward the inside of the preform 2 through the drawing orifice 41, so as to return into the preform 2. The timing of returning the liquid 4 that has been drawn into the drawing and discharging flow path 42 into the preform 2 or the container 3 may be changed in various ways.

Moreover, the shape, the number, the location, or the like of drawing orifices 41, those of drawing and discharging flow paths 42, and those of communication grooves 71 can be changed in various ways.

REFERENCE SIGNS LIST

1 Blow molding apparatus
2 Preform
2a Mouth
2b Body
2c Bottom
3 Container
4 Liquid (incompressible fluid)
10 Mold
11 Cavity
20 Nozzle unit
20a Nozzle unit main body
21 Main body block
22 Support block
23 Blow nozzle
23a Nozzle tip
23b Sealing surface
24 Blow nozzle moving unit
25 Supply flow path
26 Liquid supply port
27 Sealing body
27a Tapered surface
28 Shaft body
29 Discharge rod
29a Discharge orifice
29b Opening and closing body
29c Opening and closing rod
29d Intratubular flow path
30 Pressurized fluid supply unit
30a Cylinder
30b Plunger
40 Fluid drawing and flowing out mechanism
41 Drawing orifice
42 Drawing and discharging flow path
43 Fluid drawing source 44 Pressurized gas supply source
45 Check valve
50 Piston member
51 Shaft body
52 Cylinder
53 Storage space
60 Open flow path
70 Tubular wall
71 Communication groove
P1 First pipe
P2 Second pipe
P3 Third pipe
P4 Fourth pipe
P5 Fifth pipe
V1 First opening and closing valve
V2 Second opening and closing valve
V3 Third opening and closing valve
V4 Fourth opening and closing valve
V5 Fifth opening and closing valve
PG1 Pressure gauge
PG2 Pressure gauge
H Headspace

The invention claimed is:

1. A blow molding apparatus comprising:
a mold for blow molding;
a blow nozzle placed above the mold;
a sealing body configured to open and close the blow nozzle;
a pressurized fluid supply unit configured to supply a pressurized incompressible fluid to the blow nozzle;
a blow nozzle moving unit configured to move the blow nozzle relative to the mold between a connected position, in which the blow nozzle is connected to a mouth of a preform placed into the mold, and a standby position, in which the blow nozzle is above and away from the mouth;
a drawing and discharging flow path connected to a drawing orifice;
a fluid drawing source connected to the drawing and discharging flow path, the fluid drawing source being configured to apply drawing force to the drawing and discharging flow path, after blow molding is completed and after and/or while the blow nozzle is moved from the connected position to the standby position while the blow nozzle is closed by the sealing body, so as to draw the incompressible fluid adhering to the blow nozzle into the drawing and discharging flow path; and
a pressurized gas supply source connected to the drawing and discharging flow path, the pressurized gas supply source being configured to supply a pressurized gas to the drawing and discharging flow path, after blow molding is completed and after a blow molded container is removed from the mold and a next preform is placed into the mold, so as to cause the incompressible fluid that has been drawn into the drawing and discharging flow path by the fluid drawing source to flow out through the drawing orifice toward the inside of the next preform or toward the inside of a container into which the next preform is to be blow molded,
wherein
the pressurized incompressible fluid is supplied into the preform from the pressurized fluid supply unit through the blow nozzle that is in the connected position, so as to blow mold the preform into a container having a shape corresponding to a cavity of the mold,
the blow molding apparatus is configured to, before the preform is blow molded, perform an air discharge step of supplying the incompressible fluid into the preform to thereby discharge air inside the preform to the outside through an open flow path, and the drawing and discharging flow path and the open flow path are separately connected to the blow nozzle.

2. The blow molding apparatus according to claim 1, wherein the drawing orifice is open to the blow nozzle.

3. The blow molding apparatus according to claim 2, wherein
the sealing body includes a tubular wall that is placed inside the blow nozzle when the sealing body is closed, and
the tubular wall is provided, on an inner peripheral surface thereof, with a communication groove that extends upward from a lower end of the tubular wall and that communicates with the drawing orifice when the sealing body is closed.

4. The blow molding apparatus according to claim 3, comprising
a discharge rod that is provided with a discharge orifice, that passes through the sealing body, and that is movable relative to the sealing body, the discharge orifice being connected to the pressurized fluid supply unit by a discharge path and being configured to be opened and closed, wherein
after blow molding is completed, the blow molding apparatus is configured to perform a first suck-back step of causing the pressurized fluid supply unit to perform a drawing operation in a state in which the sealing body is opened, and a second suck-back step, performed after the first suck-back step, of causing the pressurized fluid supply unit to perform a drawing operation in a state in which the sealing body is closed and the discharge orifice is opened, and
in the second suck-back step, the pressurized gas supply source is configured to operate so as to cause the incompressible fluid inside the drawing and discharging flow path to flow out through the drawing orifice toward the inside of the container.

5. The blow molding apparatus according to claim 4, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

6. The blow molding apparatus according to claim 3, wherein
in the air discharge step, the pressurized gas supply source is configured to operate so as to cause the incompressible fluid inside the drawing and discharging flow path to flow out through the drawing orifice toward the inside of the preform.

7. The blow molding apparatus according to claim 6, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

8. The blow molding apparatus according to claim 3, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

9. The blow molding apparatus according to claim 2, comprising
a discharge rod that is provided with a discharge orifice, that passes through the sealing body, and that is movable relative to the sealing body, the discharge orifice being connected to the pressurized fluid supply unit by a discharge path and being configured to be opened and closed, wherein
after blow molding is completed, the blow molding apparatus is configured to perform a first suck-back step of causing the pressurized fluid supply unit to perform a drawing operation in a state in which the sealing body is opened, and a second suck-back step, performed after the first suck-back step, of causing the pressurized fluid supply unit to perform a drawing operation in a state in which the sealing body is closed and the discharge orifice is opened, and
in the second suck-back step, the pressurized gas supply source is configured to operate so as to cause the incompressible fluid inside the drawing and discharging flow path to flow out through the drawing orifice toward the inside of the container.

10. The blow molding apparatus according to claim 9, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

11. The blow molding apparatus according to claim 2, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

12. The blow molding apparatus according to claim 2, wherein
in the air discharge step, the pressurized gas supply source is configured to operate so as to cause the incompressible fluid inside the drawing and discharging flow path to flow out through the drawing orifice toward the inside of the preform.

13. The blow molding apparatus according to claim 12, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

14. The blow molding apparatus according to claim 1, comprising
a discharge rod that is provided with a discharge orifice, that passes through the sealing body, and that is movable relative to the sealing body, the discharge orifice being connected to the pressurized fluid supply unit by a discharge path and being configured to be opened and closed, wherein
after blow molding is completed, the blow molding apparatus is configured to perform a first suck-back step of causing the pressurized fluid supply unit to perform a drawing operation in a state in which the sealing body is opened, and a second suck-back step, performed after the first suck-back step, of causing the pressurized fluid supply unit to perform a drawing operation in a state in which the sealing body is closed and the discharge orifice is opened, and
in the second suck-back step, the pressurized gas supply source is configured to operate so as to cause the incompressible fluid inside the drawing and discharging flow path to flow out through the drawing orifice toward the inside of the container.

15. The blow molding apparatus according to claim 14, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

16. The blow molding apparatus according to claim 1, wherein
in the air discharge step, the pressurized gas supply source is configured to operate so as to cause the incompressible fluid inside the drawing and discharging flow path to flow out through the drawing orifice toward the inside of the preform.

17. The blow molding apparatus according to claim 16, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

18. The blow molding apparatus according to claim 1, wherein
a piston member is provided on the drawing and discharging flow path, the piston member being configured to perform a pull operation when the fluid drawing source operates, so as to increase a storage space for storing the incompressible fluid inside the drawing and discharging flow path, and being configured to perform a push operation when the pressurized gas supply source operates, so as to reduce the storage space.

* * * * *